(12) United States Patent
Hagl et al.

(10) Patent No.: US 6,665,945 B2
(45) Date of Patent: Dec. 23, 2003

(54) METHOD FOR OPERATING A TOUCH PROBE SYSTEM AND A TOUCH PROBE SYSTEM FOR EXECUTING THE METHOD

(75) Inventors: Rainer Hagl, Altenmarkt (DE); Kurt Feichtinger, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/190,294

(22) Filed: Jul. 3, 2002

(65) Prior Publication Data

US 2003/0019121 A1 Jan. 30, 2003

(30) Foreign Application Priority Data

Jul. 4, 2001 (DE) .......................... 101 32 554

(51) Int. Cl.[7] .............................................. G01B 5/012
(52) U.S. Cl. ........................................... 33/561; 33/558
(58) Field of Search ........................ 33/503, 556, 557, 33/558, 559, 560, 561

(56) References Cited

U.S. PATENT DOCUMENTS

| | | | |
|---|---|---|---|
| 4,510,693 A | 4/1985 | Cusack | |
| 4,543,859 A | 10/1985 | Cusack | |
| 5,056,235 A | * 10/1991 | Thomas | 33/503 |
| 5,150,529 A | 9/1992 | Collingwood | |
| 5,526,576 A | 6/1996 | Fuchs et al. | |
| 5,778,550 A | 7/1998 | Carli et al. | |
| 6,301,796 B1 | * 10/2001 | Cresson | 33/556 |
| 6,370,789 B1 | 4/2002 | Madlener et al. | |
| 6,472,981 B1 | * 10/2002 | Fuge et al. | 340/539.1 |

FOREIGN PATENT DOCUMENTS

| | | |
|---|---|---|
| DE | 34 22 103 | 12/1984 |
| DE | 41 22 896 | 9/1992 |
| DE | 43 30 873 | 3/1995 |
| DE | 200 03 960 | 8/2000 |
| DE | 199 29 557 | 1/2001 |
| DE | 199 13 580 | 2/2001 |
| EP | 0 506 318 | 9/1992 |
| GB | 2 179 744 | 3/1987 |

* cited by examiner

*Primary Examiner*—G. Bradley Bennett
(74) *Attorney, Agent, or Firm*—Brinks Hofer Gilson & Lione

(57) ABSTRACT

A touch probe system that includes a receiver and a probe head that has a probe element positioned in a work space and a transmitter that transmits signals to the receiver. A rotating mechanism connected to the probe head for rotating the probe head around an axis in case of a change of position of the probe head within the work space so that the receiver receives signals from the transmitter even after the change of position.

24 Claims, 1 Drawing Sheet

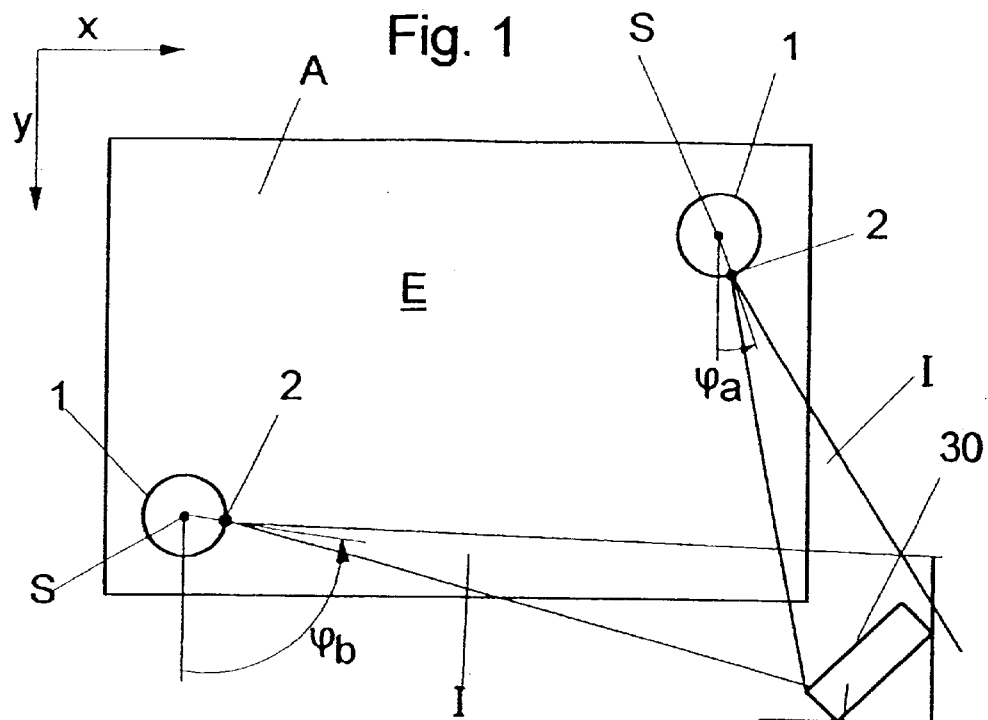
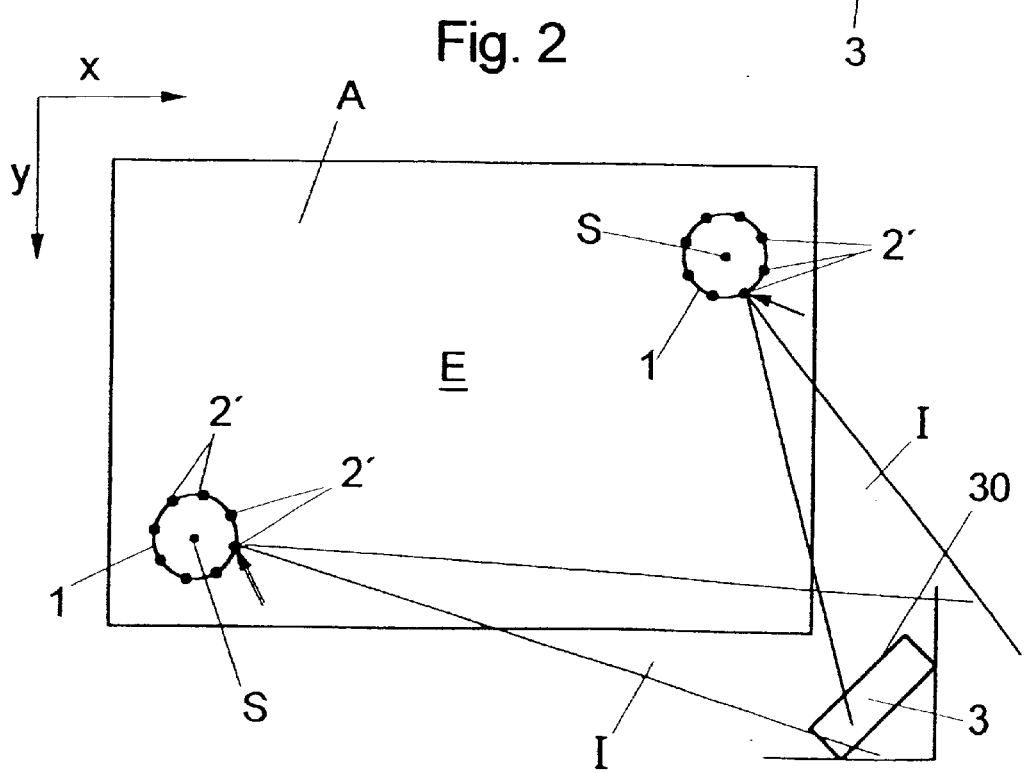

METHOD FOR OPERATING A TOUCH PROBE SYSTEM AND A TOUCH PROBE SYSTEM FOR EXECUTING THE METHOD

Applicants claim, under 35 U.S.C. §119, the benefit of priority of the filing date of Jul. 4, 2001 of a German patent application, copy attached, Serial Number 101 32 554.1, filed on the aforementioned date, the entire contents of which is incorporated herein by reference.

BACKGROUND OF THE INVENTION

1. Field of the Invention

The present invention relates to a method for operating a touch probe system with a probe head, which has a probe element which can be deflected upon contact with a component to be touched, which is positioned in a work space for touching the component, and which transmits directional signals to a receiver by a transmitter. The present invention also relates to a touch probe system for executing the method.

2. Discussion of Related Art

A touch probe system with a deflectable probe element, which, when the probe element is deflected out of a position of rest, emits a switching signal, is used in particular for determining the position of workpieces clamped in material-processing machines, for example milling machines.

In this case the position of rest of the probe element is understood to be a position in which the probe element has no contact with the workpiece to be touched. In the course of a contact of the probe head with the workpiece, the probe element is deflected out of its position of rest and an electrical signal is generated by a suitable transformer when the deflection exceeds a preset touching threshold.

A touch probe system of the type mentioned at the outset is known from GB 2 179 744 B, wherein a number of light-emitting diodes is arranged on the circumference of a probe head supporting the probe element which, as the transmitter, transmit a switching signal, which was generated in the course of the deflection of the probe element, in a contact- and cable-less manner to a stationary receiver arranged outside the probe head. The arrangement of a plurality of light-emitting diodes along the circumference of the probe head is necessary here because it is assured, even in case of a change of the position of the probe head in the machine tool, that the stationary receiver is within the range in which it can receive one of the transmitters. In this way it is assured that via the light-emitting diodes it is actually possible to supply the stationary receiver with a switching signal generated in the course of the deflection of the probe element. The receiver in turn is connected with an evaluation unit, in which the received signals are evaluated and made available for controlling the machine tool.

The touch probe system known from GB 2 179 744 B has the disadvantage that a comparatively large energy requirement exists because of the multitude of light-emitting diodes, which emit appropriate light signals in case the operating point is exceeded, and also of the generation of an electrical signal connected therewith. This results in a shortened service life of the battery by which the light-emitting diodes are provided with electrical energy.

OBJECT AND SUMMARY OF THE INVENTION

An object of the present invention is based on creating a method for operating a touch probe system of the type mentioned at the outset which, along with the lowest possible energy requirement, assures that directional signals can be transmitted from the probe head (without cables) to at least one stationarily arranged receiver.

This object is attained in accordance with the present invention by the provision of a method for operating a touch probe system that includes a receiver and a probe head having a probe element. The method includes contacting a component positioned in a work space. Transmitting first signals from the probe head to a receiver and changing a position of the probe head in the workspace by rotating the probe head around at least one axis so that the receiver is still able to receive subsequent signals from the probe head.

This object is also attained in accordance with the present invention by the provision of a method for operating a touch probe system that includes a receiver and a probe head having a probe element and a first transmitter and a second transmitter. The method includes contacting a component positioned in a work space. Transmitting first signals from the first transmitter to the receiver and changing a position of the probe head in the workspace so that the receiver is able to receive subsequent signals from the second transmitter and activating the second transmitter and deactivating the first transmitter as a function of a position of the probe head.

It is a further object of the present invention to disclose a touch probe system by which the method of the present invention for operating a touch probe system can be executed.

This further object is attained by a touch probe system that includes a receiver and a probe head that has a probe element positioned in a work space and a transmitter that transmits signals to the receiver. A rotating mechanism connected to the probe head for rotating the probe head around an axis in case of a change of position of the probe head within said work space so that the receiver receives signals from the transmitter even after the change of position.

This further object is also attained by a touch probe system that includes a receiver and a probe head that has a probe element positioned in a work space. A first transmitter that transmits signals to the receiver and a second transmitter that transmits signals to the receiver and an activation mechanism connected to the first transmitter and the second transmitter, the activation mechanism activating either the first transmitter or the second transmitter as a function of a position of the probe head within the work space.

In accordance with an embodiment of the present invention, the probe head is rotated around at least one axis when its position inside its work space (which is defined by the respective machine tool, for example) is changed in such a way that, even after a position change, the associated receiver is within a range where it can receive a directional signal from the transmitter of the probe head.

Thus, the attainment of an object in accordance with the present invention allows the transmission of directional signals from a transmitter (which can only be received within a limited solid angle) to a stationarily arranged receiver, regardless of the position of the probe head in its work space.

The attainment of an object of the present invention can be employed independently of whether one or more stationary receivers, by which the transmitted signal can be received, are assigned to the probe head. It is necessary to assure in every case by a rotation of the probe head when its position in the work space is changed, that the receiver(s) is/are within the receiving area of the respectively assigned transmitter.

Because of the change of the orientation of the probe head provided in accordance with the present invention when its position in the work space is changed, it is only necessary to assign a single transmitter on the probe head to the stationary receiver. In case of a change of the position, the probe head is aligned by a reorientation (rotation around at least one axis) in such a way that the receiver continues to be located within the range where it can receive directional signals from the associated transmitter (such directional signals are radiated in a defined direction and therefore have a directional characteristic which is typically constituted by a cone of radiation). By this the number of required transmitters is minimized, and the energy requirements are correspondingly reduced. This results in an increase of the service life of the battery providing electrical energy.

For example, the directional signals to be transmitted by the transmitter are a ready signal sent in defined intervals (for example every 3.3 milliseconds), a switching signal once the probe element has been deflected past the operating point, as well as possibly a battery warning signal indicating a requirement for a replacement of the battery in the near future.

The attainment of an object of the present invention is particularly suitable for use with touch probe systems whose probe head, together with the probe element, can be moved mainly on one level or plane in a work space, wherein the movement of the probe head is limited perpendicularly with respect to this level by the extension of the receiving area (diameter of the cone of radiation) of the transmitter at the location of the respectively assigned stationary receiver. An example of such a plane is identified as E in FIGS. 1 and 2. This means that only those motions of the probe head occur perpendicularly in relation to the level or plane E, which do not result in the receiver coming outside of the range where in can receive the transmitter. In this case, following each position change of the probe head, a rotation of the probe head around an axis is sufficient, particularly by a spindle, in order to assure that the respectively assigned stationary receiver remains within the range in which it can receive the directional signals from the transmitter even after a position change of the probe head.

For the definite following, or reorientation, of the probe head it is necessary that the coordinates of the work space in which the probe head is positioned, as well as the coordinates of the assigned receiver, are known to the control device used for this. Since the attainment of an object of the present invention is intended in particular for use in machine tools, and since in this case the machine control device takes on the positioning, and simultaneously also the orientation of the probe head, this information is already available as a rule.

In accordance with an embodiment of the present invention, the probe head is arranged from the beginning, i.e. already prior to being put into operation, in such a way, and in particular is fixed in place on a spindle of a machine tool in such a way, that the stationary receiver(s) is/are within a range where they can receive the transmitter(s) in the probe head. If now the coordinates of the probe head, on the one hand, and of the stationary receiver(s) on the other, are known, hereafter a reorientation of the probe head by a control device can be automatically performed at each position change, which assures that the receiver(s) remain(s) within a range in which it/they can receive the respectively associated transmitter of the probe head.

If, however, the orientation of the probe head is not known prior to starting operations, the following procedure is followed:

The probe head is positioned at a known location in the work space (with predefined coordinates), i.e. it is fixed in place for example on an appropriately positionable spindle of a machine tool.

Thereafter the orientation of the probe head is changed, for example by rotating the spindle, in such a way that the control device registers the receipt of ready signals from the probe head by a receiving unit for the first time. This means that now the probe head has an orientation in which the associated stationary receiver is located just at the edge of the area in which the corresponding transmitter can be received.

This orientation of the probe head (corresponding to a defined angle of rotation of the spindle) is stored in the control device (as a first angular position of the spindle).

Thereafter the change of the orientation (by continued turning of the spindle along the same direction of rotation as before) is continued until the control device no longer registers ready signals. This means that the receiver is now located just outside the area in which the corresponding transmitter can be received.

The last described orientation of the probe head (corresponding to a different angle of rotation of the spindle) is also stored (as the second angular position of the spindle).

A check can subsequently be performed to determine whether the previously stored orientations of the probe head (in the form of a first and second angular position of the spindle) are plausible in view of the known radiation characteristics of the transmitter.

If the plausibility check has had a positive result, the probe head is then oriented in such a way (corresponding to an angle of rotation exactly between the first and second stored angular positions) that the respective stationary receiver is located in the center of the area in which it can receive the transmitter in the probe head.

Following this it is now possible to start the touching of one or several workpieces, wherein a position change of the probe head for the purpose of touching is then accompanied by a reorientation of the probe head (by rotating the spindle), if the stationary receiver were to leave the area where it can receive the associated transmitter without such a reorientation.

However, there is the problem that the switching characteristics of a probe element are never exactly axially symmetrical because of production tolerances. This means that in case of a deflection of the probe element in various directions, the operating points of the touch probe system can slightly vary. But a change in the orientation of the probe head, such as provided in accordance with the present invention, results in that the probe element (depending on the orientation of the probe head in the course of touching a workpiece) is deflected in different directions during different touching processes at different positions in the work space. To remedy this problem it is necessary to store the dependence of the operating point of the touch probe system on the direction of the deflection of the probe element, which can be determined by a calibrating run, for example, in the control device. It is then possible to compensate the deviations from a directionally independent switching characteristic.

In accordance with an embodiment of the present invention a method for operating a touch probe system with a probe head having a plurality of transmitters (i.e. at least two, but preferably more than two transmitters) arranged (for example annularly behind each other), each of which transmits directional signals to a receiver, that, as a function of the position of the probe head in the work space, only the at least one transmitter is respectively activated, in whose transmission range the receiver is located. The non-activated transmitters are each switched off, so that they do not consume any electrical energy.

This attainment of an object of the present invention has the advantage that in case of a change of the positions of the probe head it is not necessary to perform a reorientation (rotation around an axis) of the probe head, and instead only another suitable transmitter must be activated. However, this attainment of an object of the present invention requires a plurality of transmitters arranged on the circumference of the probe head, so that in every position of the probe head the stationary receiver(s) is/are within a range for receiving at least one of the transmitters.

By this it is also possible to reduce the energy requirements of the touch probe system and to prolong the service life of the battery correspondingly. However, it is required that the probe head can receive signals from a control device which cause the activation of the respectively suitable transmitter. Therefore this attainment of an object of the present invention is particularly suited to touch probe systems with a bidirectional interface between the probe head on the one hand and the control device on the other, in connection with which therefore signals can be transmitted from a transmitter in the probe head to a stationary receiver, as well as that vice versa, signals triggered by a control unit can be received by a respective receiver on the probe head.

In accordance with a variation of the present invention, the activation of a suitable transmitter takes place automatically as a function of the movement of the probe head in the work space. In this case the starting coordinates of the probe head, as well as their changes in the course of a movement of the probe head, and finally the connection between the actual coordinates of the probe head and the respective transmitter to be activated, must be stored in the machine control, or must be determined by it in the course of operation.

In accordance with another variation of the present invention, the individual transmitters are each briefly activated following a change in position of the probe head in order to check whether the respective stationary receiver is within the range in which it can receive signals from the respective transmitter. Then, during the further measuring cycle only that transmitter is operated, which has caused the report "touch probe system ready" from the receiver in the course of this "switch-through process". In this case, switching-through of the individual transmitters is again necessary after each change of the position of the probe head. An important advantage of this variation of the present invention lies in that it is possible to determine the respective transmitter which should actually be activated, without it being necessary to know the coordinates of the probe head, nor even those of the associated stationary receiver.

The switching-through process can in this case be controlled either within the probe head itself, or by a control device (machine control) arranged outside the probe head.

When controlling the switching-through process by the touch probe system it is required to provide a time window in the respective control device which, after the system readiness was lost, permits sufficient time for an assured detection of the correct transmitter before further touching processes are performed. It is prevented by this that several changes between the states of "touch probe system ready" and "touch probe system not ready" occur in the course of switching through the transmitters.

If it is found in the course of switching through that several transmitters cause the report "touch probe system ready" to appear, the most advantageous transmitter can be selected, which generates the strongest signal in the receiver.

It is advantageous in every case if the areas in which transmitters arranged next to each other overlap in such a way that the receiver(s) is/are within the range to receive a transmitter in every work position of the probe head. In the course of the transition from one transmitter to the adjoining transmitter, both transmitters are briefly activated, so that the transmission of signals to the receiver, or the receivers, is always assured.

Since for individual measuring tasks (for example for digitizing) only one transmitter is required on the probe head, but for other measuring tasks (for example bead measurement) at least two transmitters offset by 180° are required, it is advantageous for reducing the energy requirements if the touch probe system can be switched either automatically or manually in such a way that it is possible to fix the number of active transmitters (one transmitter or two transmitters), depending on the respective measuring task.

Moreover, the reduction of the number of respectively active transmitters is also advantageous in view of interference behavior, since in this way the pickup by other systems, as well as interfering reflections, can be prevented.

Further characteristics and advantages of the present invention ensue from the following description of exemplary embodiments by the drawings.

BRIEF DESCRIPTION OF THE DRAWINGS

FIG. 1 shows an embodiment of a probe head according to the present invention, which is positioned on a level in a work space of a machine tool, which is rotated as a function of its work position around a spindle axis S in the work space in such a way that an associated stationary receiver is always within the range in which it receives signals from a transmitter provided on the probe head in accordance with the present invention; and FIG. 2 is a variation of the exemplary embodiment in FIG. 1, wherein an embodiment of a probe head has a plurality of transmitters on its circumference, of which only the one, within whose range a associated stationary receiver is located, is activated in accordance with the present invention.

DETAILED DESCRIPTION OF THE PREFERRED EMBODIMENTS

A two-dimensional work space A of a machine tool is represented in FIG. 1. The machine tool includes a rotating mechanism, such as a spindle S, upon which a probe head 1 of a touch probe system (switching scanner) is arranged. Such a probe head 1 has a deflectable probe head and is used for touching a workpiece, which is arranged in the work space and is to be processed by the machine tool. The exact design of such touch probe systems alone, as well as the performance of the touching process alone, are known. Reference is made in this connection to DE 43 30 873 A1, as well as DE 199 29 557 A1, as examples. The subsequent description is limited to the particulars of the present invention in connection with the positioning of the probe head 1 inside the work space A for bringing the probe element into contact with a workpiece to be touched.

In accordance with FIG. 1, for this purpose the probe head 1 can be moved on a level or plane E, which is defined by a right-angled coordinate system xy in the work space A of the machine tool. The probe head 1 is seated on a spindle S of the respective machine tool and can be moved together with it on the level E in the work space A. The change in position of the probe head 1 within the work space A is controlled by the control device of the machine tool associated with the spindle S described below.

The probe head 1 has an infrared transmitter 2, by which a ready signal of the probe head 1, as well as a switching signal containing contact information and occurring when touching a workpiece or component, can be transmitted contactless and without cables by directional (i.e. radiated in a defined spatial direction) infrared signals I, which form a cone of radiation, to a stationary receiver 3 arranged outside of the work space. This receiver 3 contains a radiation-sensitive surface 30, on which the infrared directional signals transmitted by the transmitter 2 must impinge so that they generate an electrical signal there, which can be evaluated. The latter is made available to the machine control device, so that the respective actual data regarding the readiness of the touch probe system, as well as possible switching operations in the course of touching the workpiece, are available there. Note that the transmitter 2 and the receiver 3 may be components of a unidirectional or a bidirectional interface between the probe head and the associated control device.

To assure that the radiation-sensitive surface 30 of the receiver 3 is always within the range in which it can receive signals from the transmitter 2, regardless of the work position of the probe head 1 in the work space A, in accordance with the present invention a change of the position of the probe head 1 on the level E is always accompanied by a rotation of the probe head 1 around one or more axes, such as the axis of the spindle S, which extends perpendicularly with respect to the level E. In this case the angle, by which the probe head 1 is rotated about the rotation axis of the spindle S, is set by the machine control device in such a way that the receiver 3 is within the range of the cone of radiation emitted by the transmitter 2, even following a position change of the probe head 1. Expressed differently, each position change of the probe head 1 on the level E is accompanied by a reorientation or alignment of the probe head with respect to the axis of the spindle S extending perpendicularly in relation to the level E, which makes possible the reception of signals from the transmitter 2 by the receiver 3. Of course, such reorientation or alignment is performed prior to a second touching of the workpiece by the probe head 1 in order to assure that the touch signal is correctly detected by the receiver 3.

By way of example, the probe head 1 is represented in FIG. 1 in two different positions inside the work space A, wherein the receiver 3 is within the range of the cone of radiation of the transmitter 2 at the probe head 1 in each one of the two positions. In a first position of the probe head 1, its transmitter 2 lies (in a counterclockwise direction) outside of a straight line, which extends parallel with the y-axis and through the axis of the spindle S, by a first angle (pa In the other position of the probe head 1, the appropriate angle $\phi_b$ is adapted by a rotation of the spindle S in such a way that the receiver 3 continues to be within the range in which it can receive signals from the transmitter 2 of the probe head 1 in spite of the position change.

By this it is possible with only a single transmitter 2 at the probe head 1 that signals regarding the status of the touch probe system are always transmitted from the probe head 1 to an associated stationary receiver 3. This means correspondingly reduced energy requirements of the touch probe system, and therefore an increased service life of the battery.

A variation of the exemplary embodiment in FIG. 1 is represented in FIG. 2, having a probe head 1, on whose circumference a plurality of transmitters 2' are arranged one behind the other on a level E. In this case there are a total of eight transmitters 2'. The number of the transmitters 2' and therefore also the distance between the transmitters 2' (in this case arranged at equal distances from each other) has been selected in such a way that with each position of the probe head 1 in the work space A the receiver 3 is always within the range in which it can receive signals from at least one of the transmitters 2'. This is also assured in that the cones of radiation of adjoining transmitters 2' overlap each other.

Following a change in the position of the probe head 1 in the work space A, the transmitter 2', within whose range the radiation-sensitive surface 30 of the receiver 3 is located, is respectively activated while all other transmitters 2' are deactivated. In this case a rotation of the probe head 1 around its spindle axis is not required.

The activation of the respective transmitter can take place automatically via an activation mechanism connected to the transmitters 2', on the one hand (if all data relevant to this are stored in a machine control device, and moreover the transmission of signals from the machine control device to the probe head 1 is possible, for example by a bidirectional interface), or by the above explained testing switch-through of the individual transmitters 2', wherein finally the transmitter, which assures the best reception by the receiver 3, is activated while all other transmitters 2' are deactivated. Thus, the activation and deactivation of transmitters in either scenario is a function of position and orientation of the probe head 1.

An example of the latter scenario mentioned above would be to move from the upper right hand corner to the lower left hand corner of work space A to of FIG. 2. At the initial position, touching is performed by the probe head and a transmitter 2' sends distributional signals to receiver 3. Once the probe head 1 reaches the final position, touching is again performed by probe head 1. In addition, the initial transmitter is briefly activated to see if signals from the initial transmitter are received by the receiver 3. If they are not received, then the initial transmitter is deactivated and a second transmitter 2' is briefly activated to see if signals from the second transmitter are received by the receiver 3. If they are, then the second transmitter is activated and directional signals are sent to the receiver 3. If they are not, then the above process is continued until a transmitter is found that can send signals that are received by the receiver 3.

In the exemplary embodiment represented in FIG. 2, transmitters 2' are provided along the entire circumference of the probe head 1 on the level E, in which the probe head 1 can be moved. If required, it is possible by this to provide signals to several stationary receivers at various locations outside of the work space A. In the present case with only one receiver 3, only a portion of these transmitters 2' would be required for assuring the reception in every position of the probe head 1 in the work space A.

It becomes clear by the two work positions of the probe head 1 represented in FIG. 2 that in the course of the transition from one into the other touching position the activation from one transmitter 2' to another transmitter 2' is necessary. In FIG. 2 the respectively activated transmitter is marked by an arrow.

Thus, with the exemplary embodiment represented in FIG. 2, a clear reduction of the energy requirements, and therefore an increased service life of the battery is also achieved, wherein this is here based on the activation of respectively only one transmitter 2'.

Note that while the above examples disclose only one transmitter 2' activated at any one time, it is also possible to activate two or more transmitters 2' as long as each is able to send signals to a receiver. For example, it is possible that there are situations where two transmitters 2' that are 180° apart with respect to the rotation axis of the spindle S can be simultaneously activated.

Within the scope of the present invention, further embodiment variations of course also exist besides the explained example.

We claim:

1. A method for operating a touch probe system comprising a receiver and a probe head having a probe element, the method comprising:
   contacting a component positioned in a work space;
   transmitting first signals from said probe head to a receiver; and
   changing a position of said probe head in said workspace and rotating said probe head around at least one axis so that said receiver is still able to receive subsequent signals from said probe head.

2. The method in accordance with claim 1, wherein said rotating said probe head is performed by a spindle.

3. The method in accordance with claim 1, further comprising:
   aligning said probe head relative to said receiver prior to contacting said component in said changed position of said probe head by rotating said probe head around one of said at least one axis in such a way that said receiver is within range to receive said subsequent signals.

4. The method in accordance with claim 2, further comprising:
   aligning said probe head relative to said receiver prior to contacting said component in said changed position by rotating said probe head around one of said at least one axis in such a way that said receiver is within range to receive said subsequent signals.

5. The method in accordance with claim 1, further comprising:
   evaluating said subsequent signals; and
   taking into account deviations from an axially symmetrical switching characteristic of said touch probe system in relation to one of said at least one axis of rotation during said evaluating said evaluating.

6. The method in accordance claim 1, wherein said changing a position of said probe head is controlled by the control device of a machine tool.

7. The method in accordance with claim 1, wherein said at least one axis consists of a single axis.

8. The method in accordance with claim 1, further comprising deflecting said probe head upon said contacting said component.

9. A method for operating a touch probe system comprising:
   a receiver; and
   a probe head comprising a probe element and a first transmitter and a second transmitter, the method comprising:
   contacting a component positioned in a work space;
   transmitting first signals from said first transmitter to said receiver;
   changing a position of said probe head in said workspace so that said receiver is able to receive subsequent signals from said second transmitter; and
   activating said second transmitter and deactivating said first transmitter as a function of a position of said probe head.

10. The method in accordance with claim 9, wherein said activating said second transmitter takes place automatically as a function of said position of said probe head.

11. The method in accordance with claim 9, further comprising:
    briefly activating said second transmitter subsequent to said changing said position of said probe head to check whether said receiver is located to receive said subsequent signals from said second transmitter.

12. The method in accordance with claim 9, wherein said probe head further comprises a third transmitter, said method further comprising:
    briefly activating said third transmitter subsequent to said changing said position of said probe head to check whether said receiver is located to receive signals from said third transmitter;
    upon determining that said receiver is unable to receive signals from said third transmitter, briefly activating said second transmitter to check whether said receiver is located to receive said subsequent signals from said second transmitter; and
    sending said subsequent signals from said probe head to said receiver upon determining that said receiver is able to receive said subsequent signals from said second transmitter.

13. The method in accordance claim 9, wherein said changing a position of said probe head is controlled by the control device of a machine tool.

14. The method in accordance with claim 9, further comprising deflecting said probe head upon said contacting said component.

15. A touch probe system comprising:
    a receiver;
    a probe head comprising:
      a probe element positioned in a work space;
      a transmitter that transmits signals to said receiver; and
      a rotating mechanism connected to said probe head for rotating said probe head around an axis in case of a change of position of said probe head within said work space so that said receiver receives signals from said transmitter even after said change of position.

16. The touch probe system of claim 15, wherein said rotating mechanism comprises a spindle.

17. The touch probe system of claim 16, wherein said spindle is attached to a machine tool.

18. The touch probe system of claim 15, wherein said transmitter and said receiver are components of a unidirectional or a bidirectional interface between said probe head and an associated control device.

19. The touch probe system in accordance with claim 15, wherein said probe head is deflected upon contact with a component to be touched by said probe head.

20. A touch probe system comprising:
    a receiver;
    a probe head comprising:
      a probe element positioned in a work space;
      a first transmitter that transmits signals to said receiver;
      a second transmitter that transmits signals to said receiver; and
    an activation mechanism connected to said first transmitter and said second transmitter, said activation mechanism activating either said first transmitter or said second transmitter as a function of a position of said probe head within said work space.

21. The touch probe system in accordance with claim 20, wherein said activation mechanism activates either said first transmitter or said second transmitter depending on whether or not said receiver can receive signals from said first transmitter or said second transmitter when activated.

22. The touch probe system in accordance to claim 21, wherein only one of said first transmitter and said second transmitter is activated by said activation mechanism.

23. The touch probe system of claim 20, wherein said transmitter and said receiver are components of a unidirectional or a bidirectional interface between said probe head and an associated control device.

24. The touch probe system in accordance with claim 20, wherein said probe head is deflected upon contact with a component to be touched by said probe head.

* * * * *